(12) United States Patent
Taguchi et al.

(10) Patent No.: US 9,496,541 B2
(45) Date of Patent: Nov. 15, 2016

(54) ACCUMULATOR DEVICE

(75) Inventors: Makoto Taguchi, Kai (JP); Yuu Watanabe, Hokuto (JP); Nobuo Ando, Showa-cho (JP); Hidenori Takagi, Nirasaki (JP)

(73) Assignee: JM Energy Corporation, Hokuto (JP)

( * ) Notice: Subject to any disclaimer, the term of this patent is extended or adjusted under 35 U.S.C. 154(b) by 367 days.

(21) Appl. No.: 13/637,385

(22) PCT Filed: Feb. 24, 2011

(86) PCT No.: PCT/JP2011/054070
§ 371 (c)(1),
(2), (4) Date: Sep. 26, 2012

(87) PCT Pub. No.: WO2011/122181
PCT Pub. Date: Oct. 6, 2011

(65) Prior Publication Data
US 2013/0017438 A1    Jan. 17, 2013

(30) Foreign Application Priority Data

Mar. 31, 2010  (JP) ................. 2010-082162

(51) Int. Cl.
*H01M 2/06* (2006.01)
*H01G 9/025* (2006.01)
(Continued)

(52) U.S. Cl.
CPC ............. *H01M 2/30* (2013.01); *H01G 11/06* (2013.01); *H01G 11/12* (2013.01); *H01G 11/74* (2013.01);
(Continued)

(58) Field of Classification Search
CPC ........ H01M 2/06; H01G 9/025; H01G 9/155

USPC ................................... 429/181, 171
See application file for complete search history.

(56) References Cited

U.S. PATENT DOCUMENTS

2006/0115724 A1*  6/2006  Buckle et al. ................ 429/164
2006/0269840 A1   11/2006  Oogami et al.
2011/0305945 A1*  12/2011  Tada et al. ..................... 429/179

FOREIGN PATENT DOCUMENTS

JP      2001 332240       11/2001
JP      2005 19213        1/2005
(Continued)

OTHER PUBLICATIONS

MoldMaking Technology http://www.moldmakingtechnology.com/articles/galvanic-corrosion-equals-preservation (Post date on the Web: Apr. 1, 2003).*

(Continued)

*Primary Examiner* — Jonathan G Leong
*Assistant Examiner* — Seenam Agbetiafan
(74) *Attorney, Agent, or Firm* — Oblon, McClelland, Maier & Neustadt, L.L.P.

(57) ABSTRACT

An accumulator device includes: an outer container with mutually overlapped outer films bonded air-tightly to each other at a bonding portion formed along respective outer peripheral edge portions; an electrode unit accommodated inside the outer container and including positive and negative electrode sheets stacked one on another with a separator disposed therebetween, the positive and negative electrode sheets each including a current collector on which an electrode layer is formed; positive and negative electrode terminals provided to protrude from inside the outer container to outside through the bonding portion; and an electrolytic solution injected in the outer container. The positive electrode terminal includes an aluminum terminal substrate and a nickel-plating coating formed on a surface of an outer end portion of the terminal substrate located outside the outer container; an inner edge of the nickel-plating coating is located within the bonding portion.

9 Claims, 1 Drawing Sheet

(51) Int. Cl.
*H01G 9/155* (2006.01)
*H01M 2/30* (2006.01)
*H01G 11/06* (2013.01)
*H01G 11/12* (2013.01)
*H01G 11/74* (2013.01)
*H01M 2/02* (2006.01)
*H01M 4/66* (2006.01)
*H01M 2/08* (2006.01)
*H01M 2/26* (2006.01)
*H01M 10/0585* (2010.01)
*H01M 10/04* (2006.01)

(52) U.S. Cl.
CPC ........... *H01M 2/021* (2013.01); *H01M 2/0212* (2013.01); *H01M 2/06* (2013.01); *H01M 2/08* (2013.01); *H01M 2/26* (2013.01); *H01M 4/661* (2013.01); *H01M 4/667* (2013.01); *H01M 10/0585* (2013.01); *H01M 10/0413* (2013.01); *Y02E 60/13* (2013.01)

(56) References Cited

FOREIGN PATENT DOCUMENTS

| JP | 2006 324143 | | 11/2006 | |
|----|-------------|---|---------|---|
| JP | 2010 3711 | | 1/2010 | |
| JP | 2010-170979 | * | 8/2010 | .......... H01M 10/052 |

OTHER PUBLICATIONS

U.S. Appl. No. 14/005,472, filed Sep. 16, 2013, Ando, et al.
International Search Report Issued May 24, 2011 in PCT/JP11/054070 Filed Feb. 24, 2011.

* cited by examiner

ACCUMULATOR DEVICE

TECHNICAL FIELD

The present invention relates to an accumulator device which has an outer container with mutually overlapped two outer films being bonded air-tightly to each other at a bonding portion formed along the respective outer peripheral edge portions and which has electrode terminals provided so as to protrude outwardly from inside the outer container.

BACKGROUND ART

The accumulator device such as an electric double layer capacitor, a lithium ion secondary battery, or a lithium ion capacitor has an outer container which accommodates, in conjunction with an electrolytic solution, either an electrode unit having a plurality of positive electrode sheets and a plurality of negative electrode sheets alternately stacked one on another with a separator disposed therebetween, or an electrode unit with a positive electrode sheet and a negative electrode sheet stacked one on the other and wound with a separator disposed therebetween.

In the accumulator device, the positive electrode sheet is composed of, for example, to have an aluminum current collector on which an electrode layer containing a positive electrode active material is formed, while the negative electrode sheet is composed of, for example, to have a copper current collector on which an electrode layer containing a negative electrode active material is formed.

Furthermore, the outer container of the accumulator device is known to have mutually overlapped two outer films bonded air-tightly to each other at a bonding portion formed along the respective outer peripheral edge portions.

Furthermore, in the accumulator device having such an outer container, a plate-shaped positive electrode terminal electrically connected to the current collector of the positive electrode sheet and a plate-shaped negative electrode terminal electrically connected to the current collector of the negative electrode sheet are provided so as to protrude from inside the outer container to outside the outer container through the bonding portion.

Conventionally, the positive electrode terminal used was made of aluminum or made up of an aluminum terminal substrate on the surface of which a nickel-plating coating is formed, while the negative electrode terminal used was made of copper or nickel (See Patent Literature 1 and Patent Literature 2).

CITATION LIST

Patent Literature

Patent Literature 1: International Publication No. 2005/031773 (Pamphlet)
Patent Literature 2: Japanese Patent Application Laid-Open No. 2010-3711

SUMMARY OF INVENTION

Technical Problem

However, such a conventional accumulator device has the following problems.

Use of the positive electrode terminal made of aluminum would raise a problem that the surface of an outer end portion of the positive electrode terminal located outside the outer container is oxidized due to a long-term service, leading to an increase in electrical resistance between the electrode terminals.

Furthermore, use of a plurality of accumulator devices arrayed in series would raise a problem that the aluminum positive electrode terminal welded to a copper or nickel negative electrode terminal of another accumulator device would tend to cause galvanic corrosion at the welded portion during charging and discharging, leading to an increase in electrical resistance between the electrode terminals due to a long-term service.

On the other hand, when the positive electrode terminal used is made up of an aluminum terminal substrate on the surface of which a nickel-plating coating is formed, an aluminum current collector of the positive electrode sheet is welded to the surface of the nickel-plating coating on the positive electrode terminal, readily causing galvanic corrosion to occur at the welded portion during charging and discharging. Furthermore, the galvanic corrosion in turn causes the nickel dissolved in the electrolytic solution to be deposited on the current collector of the negative electrode sheet, so that the deposit brought into contact with the positive electrode sheet would cause a short circuit between the positive electrode sheet and the negative electrode sheet.

The present invention has been made on the basis of the foregoing circumstances and has as its object the provision of an accumulator device which has an outer container with mutually overlapped two outer films bonded air-tightly to each other at a bonding portion formed along the respective outer peripheral edge portions, wherein the accumulator device is configured to prevent an increase in electrical resistance between the electrode terminals and cause no short circuit between the positive electrode sheet and the negative electrode sheet due to a long-term service.

Solution to Problem

According to the present invention, there is provided an accumulator device comprising: an outer container with mutually overlapped outer films bonded air-tightly to each other at a bonding portion formed along the respective outer peripheral edge portions; an electrode unit accommodated inside the outer container and having a positive electrode sheet and a negative electrode sheet stacked one on another with a separator disposed therebetween, the positive electrode sheet and the negative electrode sheet each having a current collector on which an electrode layer is formed; a positive electrode terminal and a negative electrode terminal which are provided so as to protrude from inside the outer container to outside the outer container through the bonding portion; and an electrolytic solution injected in the outer container, wherein the positive electrode terminal has an aluminum terminal substrate and a nickel-plating coating formed on the surface of an outer end portion of the terminal substrate located outside the outer container, wherein an inner edge of the nickel-plating coating is located within the bonding portion.

In the accumulator device according to the present invention, the inner edge of the nickel-plating coating may preferably be located within a central area of the bonding portion in the width direction thereof preferably at a ratio L/W which is greater than 0 and less than 1, where W is the width of the bonding portion and L is the width of the central area.

Furthermore, the distance between the outer peripheral edge of the bonding portion and the inner edge of the nickel-plating coating may preferably be 0.5 mm or greater.

Furthermore, the distance between the inner peripheral edge of the bonding portion and the inner edge of the nickel-plating coating may preferably be 1.0 mm or greater.

Furthermore, the width of the bonding portion may preferably be 5 to 15 mm.

Furthermore, at least the surface of the negative electrode terminal may preferably be formed of nickel.

Furthermore, the accumulator device of the present invention is preferred as a lithium ion capacitor, an electric double layer capacitor, or a lithium ion secondary battery.

Advantageous Effects of Invention

According to the accumulator device of the present invention, a nickel-plating coating is formed on the surface of an outer end portion of the positive electrode terminal located outside the outer container, and the inner edge of the nickel-plating coating, that is, the boundary between the plated area and the non-plated area of the positive electrode terminal is located within the bonding portion of the outer container. Thus, oxidation of the terminal substrate and an increase in electrical resistance between the electrode terminals can be prevented even after a long-term service.

Furthermore, at least the surface of the negative electrode terminal is formed of nickel, allowing the surface of the outer end portion of the positive electrode terminal and the surface of the negative electrode terminal to be formed of the same material. Thus, when a plurality of accumulator devices are arrayed in series for use, no galvanic corrosion would occur at the welded portion between the positive electrode terminal and the negative electrode terminal of another accumulator device during charging and discharging. Thus, an increase in electrical resistance between the electrode terminals can be prevented even after a long-term service.

Furthermore, the portion of the positive electrode terminal located inside the outer container has no nickel-plating coating formed thereon but an aluminum terminal substrate exposed, thereby preventing the nickel from being deposited on the current collector of the negative electrode sheet. Thus, a short circuit between the positive electrode sheet and the negative electrode sheet can be prevented even after a long-term service.

DESCRIPTION OF EMBODIMENTS

The accumulator devices according to the present invention will hereinafter be described taking embodiments that they are embodied as a lithium ion capacitor as examples.

Figure 1:
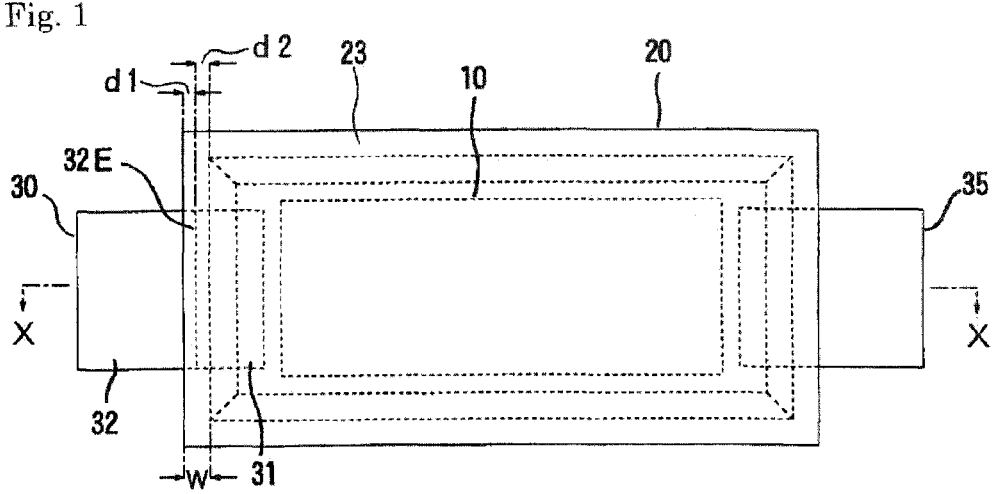
FIG. 1 is a plan view illustrating the appearance of an example of a lithium ion capacitor according to the present invention.
Figure 2:
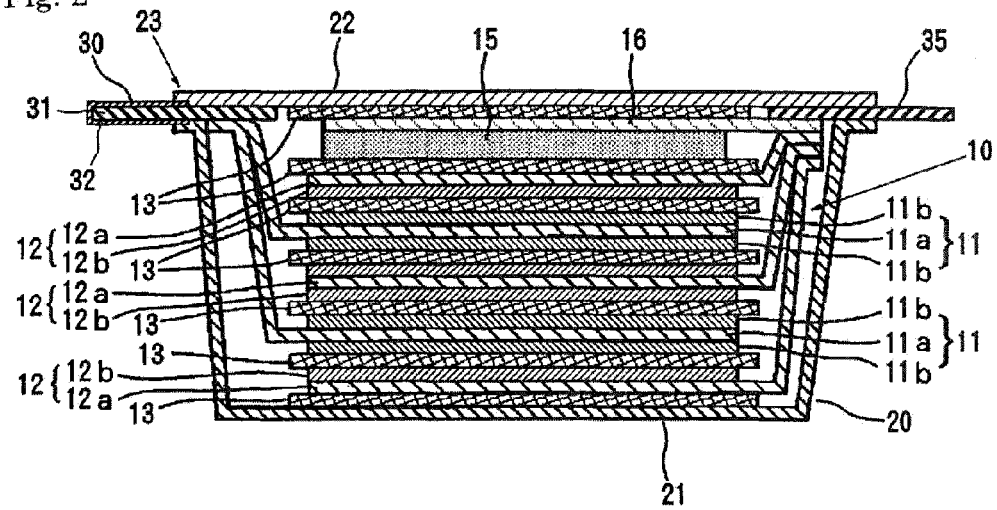
FIG. 2 is an explanatory sectional view illustrating the lithium ion capacitor taken along X-X in FIG. 1.
Figure 3:
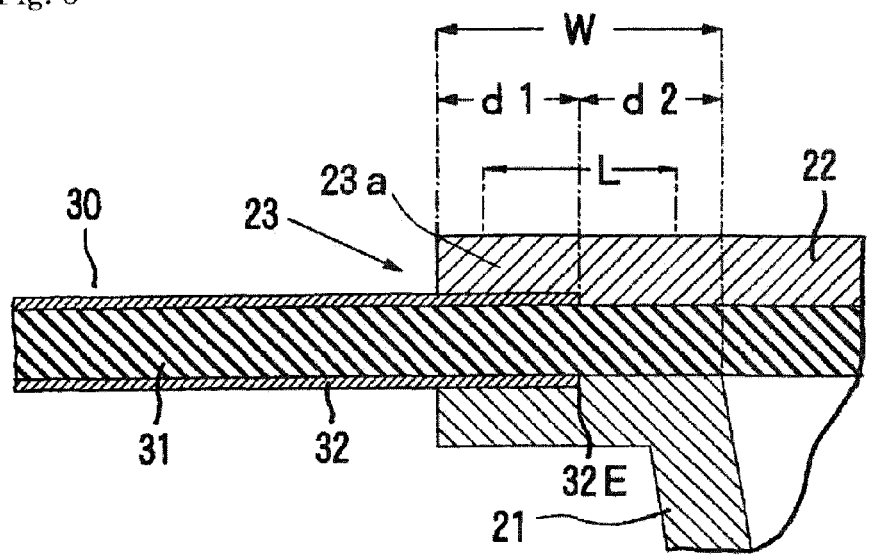
FIG. 3 is an explanatory sectional view illustrating, on an enlarged scale, the positive electrode terminal of the lithium ion capacitor shown in FIG. 1 and the vicinity thereof.

FIG. 1 is a plan view illustrating the appearance of an example of a lithium ion capacitor according to the present invention. FIG. 2 is an explanatory sectional view illustrating the lithium ion capacitor taken along X-X in FIG. 1. FIG. 3 is an explanatory sectional view illustrating, on an enlarged scale, the positive electrode terminal of the lithium ion capacitor shown in FIG. 1 and the vicinity thereof.

The lithium ion capacitor includes: an outer container 20 having two mutually overlapped outer films 21 and 22 bonded air-tightly to each other at a bonding portion 23 formed along the respective outer peripheral edge portions; a laminated-type electrode unit 10 which is housed in the outer container 20 and has a plurality of positive electrode sheets 11 and a plurality of negative electrode sheets 12; a positive electrode terminal 30 and a negative electrode terminal 35, which are each plate-shaped and disposed on one end and the other end of the outer container 20; and an electrolytic solution injected in the outer container 20.

The electrode unit 10 is constructed to have the plurality of rectangular positive electrode sheets 11 and the plurality of rectangular negative electrode sheets 12 alternately stacked upon another with sheet-shaped separators 13 therebetween.

In the electrode unit 10, the positive electrode sheet 11 has a positive electrode current collector 11a, on each of both surfaces thereof, an electrode layer 11b containing a positive electrode active material is formed, and the negative electrode sheet 12 has a negative electrode current collector 12a, on one surface or each of both surfaces thereof, an electrode layer 12b containing a negative electrode active material is formed. The positive electrode sheet 11 and the negative electrode sheet 12 are stacked one on another so that the respective electrode layers 11b and 12b are opposed to each other with the separator 13 disposed therebetween. In the example illustrated, the electrode sheets for the uppermost layer and the lowermost layer are the negative electrode sheets 12, each of the negative electrode sheets 12 being configured to have the electrode layer 12b formed on one surface of the negative electrode current collector 12a. Furthermore, each of the positive electrode current collectors 11a is electrically connected to the positive electrode terminal 30, and each of the negative electrode current collectors 12a is electrically connected to the negative electrode terminal 35.

Furthermore, the electrode unit 10 has a filmy lithium ion supply source 15 disposed on the upper surface thereof with the separator 13 interposed therebetween. The lithium ion supply source 15 is bonded under pressure to or stacked on a lithium electrode current collector 16, with the lithium electrode current collector 16 electrically connected to the negative electrode terminal 35.

In the present invention, "the positive electrode" means the electrode from which current flows during discharging and into which current flows during charging, whereas "the negative electrode" means the electrode into which current flows during discharging and from which current flows during charging.

The positive electrode current collector 11a and the negative electrode current collector 12a (hereinafter also referred to collectively as the "electrode current collector") are formed of a porous material having pores passing therethrough from the front to the rear surface. Examples of such a porous material include expanded metal, punching metal, metal net, foam, or porous foil having through-holes formed by etching.

The shape of pores in the electrode current collector may be set to a circular shape, a polygonal shape such as rectangular shapes, or any other adequate shapes. Furthermore, the thickness of the electrode current collector is preferably 20 to 50 µm from the viewpoints of strength and weight saving.

The porosity of the electrode current collector is typically 10 to 79%, preferably 20 to 60%. Here, the porosity is determined by [1−(Mass of electrode current collector/Absolute specific gravity of electrode current collector)/(Apparent volume of electrode current collector)]×100.

As the material of the electrode current collector, may be used various types of materials which are generally used for organic electrolyte batteries. As specific examples of materials for the negative electrode current collector 12a, may be mentioned stainless steel, copper, and nickel. As examples of materials for the positive electrode current collector 11a, may be mentioned aluminum, stainless steel and the like.

Using such a porous material as the electrode current collector allows lithium ions discharged from the lithium ion supply source 15 laminated on the lithium electrode current collector 16 to freely move among each electrode through the pores of the electrode current collector. Thus, the electrode layers 11b and 12b of the negative electrode sheet 12 and/or the positive electrode sheet 11 can be doped with lithium ions.

Furthermore, in the present invention, it is preferable that at least some of the pores in the electrode current collector are clogged with an electrically conductive material which will not easily fall off therefrom, and in this condition, the electrode layers 11b and 12b are formed on one surface of the electrode current collector. This makes it possible to improve the productivity of the electrode as well as to prevent or inhibit degradation in the reliability of the accumulator device which may be caused by the electrode layers 11b and 12b falling off from the electrode current collector.

Furthermore, when the thickness of the electrode (the total thickness of the electrode current collector and the electrode layer) is reduced, a much higher power density can be achieved.

Furthermore, the shape and the number of the pores in the electrode current collector may be set as appropriate so that lithium ions in an electrolytic solution to be described later can move between the front and rear surfaces of the electrode without being blocked by the current collector, and the pores can be readily closed by the electrically conductive material.

The electrode layer 12b of the negative electrode sheet 12 contains a negative electrode active material which is capable of reversibly carrying lithium ions.

As the negative electrode active material forming the electrode layer 12b, may suitably be used, for example, graphite, non-graphitizing carbon, or a polyacenic organic semiconductor (hereinafter referred to as "PAS") which is a heat-treated aromatic condensed polymer having a polyacenic skeleton structure with an atomic ratio of hydrogen atoms/carbon atoms (hereinafter referred to as "H/C") of 0.50 to 0.05.

In the present invention, the negative electrode active material preferably has a pore diameter of 3 nm or greater and a pore volume of 0.10 mL/g or more. No particular limitation is imposed on the upper limit of the pore diameter, and the pore diameter typically falls within the range from 3 to 50 nm. On the other hand, no particular limitation is imposed on the pore volume, and the pore volume falls typically within the range from 0.10 to 0.5 mL/g, preferably from 0.15 to 0.5 mL/g.

In the lithium ion capacitor according to the present invention, the electrode layer 12b of the negative electrode sheet 12 is formed on the negative electrode current collector 12a with a material which contains the negative electrode active material such as the above-described carbonaceous material or PAS. However, the forming method is not designated, and any publicly-known method can be utilized. More specifically, prepared is slurry with negative electrode active material powder, a binder, and electrically conductive powder as required dispersed in an aqueous medium or organic solvent. The slurry is applied to the surface of the negative electrode current collector 12a and then dried, or alternatively the slurry is formed into the shape of a sheet in advance, and the resulting formed product is affixed to the surface of the negative electrode current collector 12a, thereby forming the electrode layer 12b.

Here, the binder used for preparing the slurry includes: a rubber-based binder such as SBR; fluorine-based resin such as polyethylene tetrafluoride and polyvinylidene fluoride; and thermoplastic resin such as polypropylene and polyethylene. Among them, the fluorine-based resin is preferable as the binder, and it is particularly preferable to use a fluorine-based resin which has an atomic ratio of fluorine atoms/carbon atoms (hereinafter referred to as "F/C") of 0.75 or greater and less than 1.5. It is more preferable to use a fluorine-based resin having an F/C of 0.75 or greater and less than 1.3.

The amount of the binder used may vary depending on the type of the negative electrode active material and the shape of the electrode, but is 1 to 20 mass %, preferably 2 to 10% by mass relative to the negative electrode active material.

Furthermore, as examples of the electrically conductive powder to be employed as required, may be mentioned acetylene black, graphite, and metal powder. The amount of the electrically conductive powder used may vary depending on the electric conductivity of the negative electrode active material and the shape of the electrode, but the electrically conductive powder is preferably used at a rate of 2 to 40% by mass relative to the negative electrode active material.

When the electrode layer 12b is formed by applying the above-described slurry to the negative electrode current collector 12a, it is preferable to form a primer layer of an electrically conductive material on the surface of the negative electrode current collector 12a to be coated. When the slurry is directly applied to the surface of the negative electrode current collector 12a, the negative electrode current collector 12a being porous may cause the slurry to leak out of the pores of the negative electrode current collector 12a, or it may be difficult to form the electrode layer 12b having a uniform thickness because of an unsmooth surface of the negative electrode current collector 12a. Thus, the primer layer is formed on the surface of the negative electrode current collector 12a, whereby the pores are closed by the primer layer and a smooth surface to be coated is formed. This in turn facilitates applying the slurry and enables to form the electrode layer 12b having a uniform thickness.

The thickness of the electrode layer 12b of the negative electrode sheet 12 is designed to be balanced with the thickness of the electrode layer 11b of the positive electrode sheet 11 so as to ensure a sufficient energy density for the resulting lithium ion capacitor. However, when the electrode layer 12b is formed on one surface of the negative electrode current collector 12a, the thickness thereof is typically 15 to 100 μm, preferably 20 to 80 μm, from the viewpoints of the power density, energy density, industrial productivity and the like of the resulting lithium ion capacitor.

The electrode layer 11b of the positive electrode sheet 11 contains a positive electrode active material which is capable of reversibly carrying lithium ions and/or anions such as tetrafluoroborate.

As the positive electrode active material forming the electrode layer 11b, maybe used, for example, active carbon, electrically conductive polymer, or PAS which is a heat-treated aromatic condensed polymer having a polyacenic skeleton structure with an H/C of 0.05 to 0.50.

The electrode layer 11b of the positive electrode sheet 11 can be formed in the same manner as the electrode layer 12b of the negative electrode sheet 12.

As the separator 13, may be used a porous material which is durable against an electrolytic solution, the positive electrode active material and the negative electrode active material, and has communicating pores capable of being impregnated with the electrolytic solution and a low electrical conductivity.

As the material of the separator 13, may be used cellulose (paper), polyethylene, polypropylene, cellulose/rayon, thermoplastic resins such as engineering plastics and super engineering plastics, glass fiber, and other publicly-known materials. Among them, cellulose/rayon is preferred from the viewpoints of durability and profitability.

Furthermore, no particular limitation is imposed on thickness of the separator 13, but the typical thickness of the separator 13 is preferably about 20 to 50 μm.

The volume of the lithium ion supply source 15 is determined as appropriate in consideration of the amount of lithium ions to be doped in the electrode layer 12a of the negative electrode sheet 12 and the electrode layer 11a of the positive electrode sheet 11. However, the amount of doped lithium ions is preferably set to such a value that allows the positive electrode sheet 11 to be at a potential of 2.0 V or less after the positive electrode sheet 11 and the negative electrode sheet 12 have been short-circuited.

Furthermore, the thickness of the lithium ion supply source 15 is, for example, 0.1 to 0.3 mm, preferably 0.12 to 0.28 mm, more preferably 0.15 to 0.25 mm.

The lithium electrode current collector 16 is preferably formed of a material having a porous structure similar to the electrode current collector so that a lithium metal forming the lithium ion supply source 15 is readily bonded thereto under pressure and lithium ions pass therethrough when necessary. As the material of the lithium electrode current collector 16, it is also preferable to use a material, such as stainless steel, that does not react with the lithium ion supply source 15.

Furthermore, to employ as the lithium electrode current collector 16 an electrically conductive porous material such as stainless steel mesh, at least part of or particularly 80% by mass or more of the lithium metal forming the lithium ion supply source 15 is preferably embedded in the pores of the lithium electrode current collector 16, thereby reducing the gap between the positive electrode sheet 11 and the negative electrode sheet 12 caused by loss of the lithium metal even after the lithium ions are carried by the negative electrode sheet 12, further ensuring that the resulting lithium ion capacitor is maintained with improved reliability.

Furthermore, the thickness of the lithium electrode current collector 16 is preferably about 10 to 200 μm.

The outer container 20 is configured in a manner such that the two outer films 21 and 22, which are each a rectangular laminate film and overlapped each other, are air-tightly bonded to each other along the respective outer peripheral edge portions so as to form the bonding portion 23. In the example illustrated, the central portion of one of the outer film 21 has been subjected to drawing, thereby creating inside the outer container 20 a housing space for accommodating the electrode unit 10, and the electrode unit 10 is accommodated in the housing space and an electrolytic solution is injected therein.

As the outer films 21 and 22, may be used, for example, a three-layer structure film which has an inner layer such as a polypropylene layer, an intermediate layer such as an aluminum layer, and an outer layer such as of nylon.

The vertical and horizontal sizes of the outer films 21 and 22 are selected as appropriate depending on the dimensions of the electrode unit 10 to be accommodated, and the vertical size is 40 to 200 mm and the horizontal size is 60 to 300 mm, for example.

Furthermore, the width W of the bonding portion 23 is preferably 5 to 15 mm.

At one end of the outer container 20 (on the left end in FIG. 1 and FIG. 2), the plate-shaped positive electrode terminal 30 is provided so as to protrude from inside the outer container 20 to outside the outer container 20 through the bonding portion 23, whereas at the other end of the outer container 20 (on the right end in FIG. 1 and FIG. 2), the plate-shaped negative electrode terminal 35 is provided so as to protrude from inside the outer container 20 to outside the outer container 20 through the bonding portion 23.

The positive electrode terminal 30 is made up of an aluminum terminal substrate 31 and a nickel-plating coating 32 which is formed on the surface of an outer end portion of the terminal substrate 31 located outside the outer container 20. The nickel-plating coating 32 is formed such that an inner edge 32E thereof is located within the bonding portion 23.

If the positive electrode terminal 30 is configured so that the inner edge 32E of the nickel-plating coating 32 is located outside the outer container 20, then there will be raised a problem that galvanic corrosion tends to occur at the inner edge 32E of the nickel-plating coating 32 during charging and discharging with an increase in electrical resistance between the electrode terminals due to a long-term service. On the other hand, when the positive electrode terminal 30 is configured so that the inner edge 32E of the nickel-plating coating 32 is located inside the outer container 20, galvanic corrosion would tend to occur at the inner edge 32E during charging and discharging because the inner edge 32E of the nickel-plating coating 32 comes into contact with the electrolytic solution. Furthermore, there will also be another problem that the nickel dissolved in the electrolytic solution due to the galvanic corrosion is deposited on the negative electrode current collector 12a of the negative electrode sheet 12, so that the deposit is brought into contact with the positive electrode sheet 11, thereby causing a short circuit between the positive electrode sheet 11 and the negative electrode sheet 12. In view of the above-described problems, the present invention proposes a design which ensures low resistance and reduces the tendency of galvanic corrosion.

Furthermore, the inner edge 32E of the nickel-plating coating 32 is preferably located within a central area 23a in the width direction of the bonding portion 23. Assuming here that W is the width of the bonding portion 23 and L is the width of the central area 23a of the bonding portion 23, the ratio L/W is preferably greater than 0 and less than 1, more preferably 0.1 to 0.9.

More specifically, the distance d1 between the outer peripheral edge of the bonding portion 23 of the outer container 20 and the inner edge 32E of the nickel-plating coating 32 is preferably 0.5 mm or greater, more preferably 1 to 15 mm. However, the distance d1 can be altered by designing. With the distance d1 being excessively small, moisture ingress from outside into the bonding portion 23 due to a long-term service would cause corrosion to readily occur in the vicinity of the inner edge 32E of the nickel-plating coating 32.

The distance d2 between the inner peripheral edge of the bonding portion 23 of the outer container 20 and the inner edge 32E of the nickel-plating coating 32 is preferably 1.0 mm or greater. However, the distance d2 can be altered by designing. With the distance d2 being excessively small, concerns may rise that intrusion of the electrolytic solution into the bonding portion 23 would lead to corrosion.

Furthermore, the thickness of the positive electrode terminal 30 is, for example, 0.1 to 0.5 mm. Furthermore, the thickness of the nickel-plating coating 32 is preferably 1 to 3 μm.

The negative electrode terminal 35 may be formed of copper or nickel, or may be configured to have a nickel-plating coating formed on the surface of a terminal substrate made of copper. However, the negative electrode terminal 35 may have preferably at least a surface formed of nickel, more specifically, the entirety of the negative electrode terminal 35 is preferably made of nickel or provided with a nickel-plating coating formed on the surface of the terminal substrate made of copper.

Furthermore, the thickness of the negative electrode terminal 35 is, for example, 0.1 to 0.5 mm.

Furthermore, to employ the negative electrode terminal 35 with a nickel-plating coating formed on the surface thereof, the thickness of the nickel-plating coating is preferably 1 to 3 μm.

In the outer container 20, an electrolytic solution of an aprotic organic solvent electrolyte solution of a lithium salt is injected.

As the lithium salt forming the electrolyte, may be used any salt so long as it can transfer lithium ions, undergoes no electrolysis even under a high voltage, and allows lithium ions to exist with stability. Specific examples thereof include $LiClO_4$, $LiAsF_6$, $LiBF_4$, $LiPF_6$, and $Li(C_2F_5SO_2)_2N$.

Specific examples of the aprotic organic solvents include ethylene carbonate, propylene carbonate, dimethyl carbonate, diethyl carbonate, γ-butyrolactone, acetonitrile, dimethoxyethane, tetrahydrofuran, dioxolane, methylene chloride, and sulfolane. These aprotic organic solvents may be used either singly or in any combination thereof.

The electrolytic solution is prepared by mixing the above-described electrolyte and solvent in a fully dehydrated state, and the concentration of the electrolyte in the electrolytic solution is preferably at least 0.1 mol/L or greater, more preferably 0.5 to 1.5 mol/L in order to reduce the internal resistance due to the electrolytic solution.

The above-described lithium ion capacitor is obtained by accommodating the electrode unit 10 inside the outer container 20, electrically connecting the positive electrode current collector 11a and the negative electrode current collector 12a in the electrode unit 10 to the positive electrode terminal 30 and the negative electrode terminal 35, respectively, and sealing the outer container 20 after injection of the electrolytic solution in the outer container 20.

In the lithium ion capacitor assembled in such a manner, the outer container 20 is filled with the electrolytic solution that can supply lithium ions, and when left for an appropriate period of time, the negative electrode sheet 12 and/or the positive electrode sheet 11 are doped with the lithium ions discharged from the lithium ion supply source 15 by electrochemical contact between the lithium ion supply source 15 and the negative electrode sheet 12 and/or the positive electrode sheet 11.

According to the above-described lithium ion capacitor, the nickel-plating coating 32 is formed on the surface of the outer end portion of the positive electrode terminal 30 located outside the outer container 20. The inner edge 32E of the nickel-plating coating 32, that is, the boundary between the plated area and the non-plated area of the positive electrode terminal 30 is located within the bonding portion 23 of the outer container 20, thereby causing no oxidation of the terminal substrate 31. Thus, an increase in electrical resistance between the electrode terminals can be prevented even after a long-term service.

Furthermore, at least the surface of the negative electrode terminal 35 is formed of nickel, whereby the surface of the outer end portion of the positive electrode terminal 30 and the surface of the negative electrode terminal 35 are made of the same material. Thus, when a plurality of accumulator devices are arrayed in series to be used, there will occur no galvanic corrosion at the welded portion between the positive electrode terminal 30 and the negative electrode terminal 35 of another accumulator device during charging and discharging. Therefore, an increase in electrical resistance between the electrode terminals can be prevented even after a long-term service.

Furthermore, the portion of the positive electrode terminal 30 located inside the outer container 20 has no nickel-plating coating 32 formed thereon, with the terminal substrate 31 of aluminum being exposed. This causes no depositing of nickel on the negative electrode current collector 12a of the negative electrode sheet 12, and establishing no short circuit between the positive electrode sheet 11 and the negative electrode sheet 12 even after a long-term service.

While the lithium ion capacitor according to the embodiments of the present invention has been described above, the present invention is not limited to the above-described embodiments, and various changes or modifications may be made thereto.

For example, the surface of the positive electrode terminal 30 may be provided in advance with a thermo-compressive protective film on an area including the inner edge 32E of the nickel-plating coating 32, so that while being positioned on this protective film, the outer peripheral edge portions of the outer films 21 and 22 may be bonded to each other to form the bonding portion 23. Here, as the protective film, may be used resin film such as of polyethylene or polypropylene.

Furthermore, the electrode unit may be of other than the laminated type, for example, of a wound type which has the positive electrode sheet and the negative electrode sheet wound while being stacked one on the other with a separator disposed therebetween.

Furthermore, the accumulator device of the present invention is not limited to the lithium ion capacitor, but can be constructed as an electric double layer capacitor or a lithium ion secondary battery.

EXAMPLE

Example 1

In accordance with the structure shown in FIG. 1 to FIG. 3, a lithium ion capacitor was manufactured as follows.
(1) Manufacture of Negative Electrode Sheet:
Both the surfaces of a negative electrode current collector which was made of copper expanded metal (manufactured by Nippon Metal Industry Co., Ltd.) and had a porosity of 57% and a thickness of 32 μm were coated, to a target setting of a total coating thickness of 80 μm on both the surfaces, with a slurry containing a negative electrode active material using a vertical-type two-sided die coater under the coating conditions of a coating width of 130 mm and a coating speed of 8 m/min, and were then dried under a reduced pressure at 200° C. for 24 hours, thereby forming an electrode layer on the respective front and rear surfaces of a negative electrode current collector precursor. The resulting material with the electrode layer formed on part of the current collector precursor was cut into a size of 100×143 mm so that the portion on which the electrode layer was formed (hereinafter also referred to as the "coated portion" in relation to the negative electrode sheet) was 100 mm×128 mm and the portion on which no electrode layer was formed (hereinafter also referred to as the "non-coated portion" in relation to the negative electrode sheet) was 100 mm×15 mm. A negative electrode sheet with the electrode layer formed on both the surfaces of the negative electrode current collector was thus manufactured.

(2) Manufacture of Positive Electrode Sheet

Both the surfaces of an aluminum expanded metal (manufactured by Nippon Metal Industry Co., Ltd.) having a porosity of 47% and a thickness of 38 μm were coated, to a target setting of a total coating thickness of 20 μm on both the surfaces, with an electrically conductive paint using a vertical-type two-sided die coater under the coating conditions of a coating width of 130 mm and a coating speed of 8 m/min, and were then dried under a reduced pressure at 200° C. for 24 hours, thereby forming an electrically conductive layer on the respective front and rear surfaces of a positive electrode current collector precursor.

Subsequently, each of the electrically conductive layers formed on the front and rear surfaces of the positive electrode current collector precursor was coated, to a target setting of a total coating thickness of 150 μm on both the surfaces, with a slurry containing a positive electrode active material using a vertical-type two-sided die coater under the coating condition of a coating speed of 8 m/min, and were then dried under a reduced pressure at 200° C. for 24 hours, thereby forming an electrode layer on the electrically conductive layer.

The resulting material with the electrically conductive layer and the electrode layer stacked on part of a positive electrode current collector precursor was cut into a size of 98 mm×141 mm so that the portion on which the electrically conductive layer and the positive electrode layer were stacked (hereinafter also referred to as the "coated portion" in relation to the positive electrode sheet) was 98 mm×126 mm and the portion on which neither of them were formed (hereinafter also referred to as the "non-coated portion" in relation to the positive electrode sheet) was 98 mm×15 mm. A positive electrode sheet with the electrode layer formed on both the surfaces of the positive electrode current collector was thus manufactured.

(3) Manufacture of Separator

A total of twenty-two separators were manufactured which were made of cellulose/rayon mixed non-woven fabric and had a vertical and horizontal size of 102 cm×130 cm and a thickness of 35 μm.

(4) Manufacture of Electrode Unit

First, ten of the above-described positive electrode sheets, eleven of the negative electrode sheets, and twenty-two of the separators were prepared, and the positive electrode sheets and the negative electrode sheets were stacked in the order of the separator, the negative electrode sheet, the separator, and the positive electrode sheet in a manner such that the respective coated portions were overlapped with each other whereas the respective non-coated portions were located opposite to each other and thus not overlapped with each other. The four sides of the stack thus obtained were securely fixed with tape, thereby providing an electrode unit.

Subsequently, a lithium foil with a thickness of 100 μm was cut and is bonded under pressure to a copper net with a thickness of 40 μm, thereby manufacturing a lithium ion supply member. This lithium ion supply member was disposed on the electrode unit so as to be opposed to the negative electrode.

Then, an aluminum positive electrode terminal, on a seal portion of which a sealant film was pre-heat-sealed and which had a width of 50 mm, a length of 50 mm, and a thickness of 0.2 mm, was overlapped with and ultrasonically welded to the non-coated portion of each of the ten positive electrode sheets in the electrode unit manufactured as above. On the other hand, a copper negative electrode terminal, on a seal portion of which a sealant film was pre-heat-sealed and which had a width of 50 mm, a length of 50 mm, and a thickness of 0.2 mm, was overlapped with and resistance-welded to the non-coated portion of each of the eleven negative electrode sheets in the electrode unit as well as the lithium ion supply member.

(5) Manufacture of Electrode Terminal

A plate-shaped aluminum terminal substrate was manufactured which had a length of 70 mm, a width of 50 mm, and a thickness of 0.2 mm. A nickel-plating coating with a thickness of 2 μm was formed on the entire surface of one end portion which was an outer end portion of the terminal substrate, thereby providing a positive electrode terminal. The length from the outer edge of the positive electrode terminal to the inner edge of the nickel-plating coating was 53 mm.

Furthermore, also manufactured was a negative electrode terminal with a nickel-plating coating formed in a thickness of 2 μm on the entire surface of a plate-shaped copper terminal substrate which was 70 mm in length, 50 mm in width, and 0.2 mm in thickness.

(6) Manufacture of Lithium Ion Capacitor

The end portion of each positive electrode current collector in the electrode unit was overlapped with and welded to the other end portion or the inner end portion of the positive electrode terminal. On the other hand, the end portion of each negative electrode current collector in the electrode unit and the end portion of the lithium electrode current collector were overlapped with and welded to the other end portion or the inner end portion of the negative electrode terminal.

On the other hand, prepared was one outer film composed of a polypropylene layer, an aluminum layer and a nylon layer stacked, having a size of 125 mm (vertical width)×160 mm (horizontal width)×0.15 mm (thickness), and drawn at the central portion so as to be 102 mm (vertical width)×130 mm (horizontal width), and also prepared an other outer film composed of a polypropylene layer, an aluminum layer and a nylon layer stacked, and having a size of 125 mm (vertical width)×160 mm (horizontal width)×0.15 mm (thickness).

Subsequently, the electrode unit was disposed at the central position on the other outer film so that each of the positive electrode terminal and the negative electrode terminal was protruded outwardly from the end portion of the other outer film. In this state, the positive electrode terminal was disposed so that the distance between the inner edge of the nickel-plating coating and the outer peripheral edge of the other outer film (the distance corresponding to the distance d1 between the outer peripheral edge of the bonding portion 23 and the inner edge 32E of the nickel-plating coating 32 in FIG. 3) was about 5 mm. After that, the one outer film was overlapped with the electrode unit, and heat sealing was performed along three sides of the outer peripheral edge portions of the one outer film and the other outer film (including the two sides having the positive electrode terminal and the negative electrode terminal protruding therefrom), thereby forming the bonding portion of a width of 10 mm.

Then, an electrolytic solution with $LiPF_6$ dissolved in propylene carbonate at a concentration of 1 mol/L was injected in between the one outer film and the other outer film, and heat sealing was performed along the not-yet-sealed side of the outer peripheral edge portions of the one outer film and the other outer film to form the bonding portion of a width of 10 mm, thereby manufacturing the outer container and thus providing a completed lithium ion capacitor.

An examination of the properties of the resulting lithium ion capacitor obtained showed a capacitance of 1100 F, an energy density of 25 Wh/L, and an internal resistance of 2.3 mΩ.

A terminal plate was ultrasonically welded to the outer end of the positive electrode terminal in the lithium ion capacitor, wherein the terminal plate had a nickel-plating coating with a thickness of 2 μm formed on the entire surface of a plate-shaped copper terminal substrate having a length of 70 mm, a width of 50 mm, and a thickness of 0.2 mm. This lithium ion capacitor with the resulting structure was subjected to a high-temperature, high-humidity float test for 1,000 hours under the conditions of a temperature of 60° C. and a relative humidity of 80%. The test results showed no change in capacitance and electrical resistance between the negative electrode terminal and the terminal plate.

Comparative Example 1

A lithium ion capacitor was manufactured in the same manner as in Example 1, except that the positive electrode terminal was made of aluminum (with no nickel-plating coating formed thereon) and plate-shaped to have a length of 70 mm, a width of 50 mm, and a thickness of 0.2 mm.

An examination of the properties of the resulting lithium ion capacitor showed a capacitance of 1,100 F, an energy density of 25 Wh/L, and an internal resistance of 2.3 mΩ.

This lithium ion capacitor was also subjected to the high-temperature, high-humidity float test in the same manner as in Example 1. The results showed no change in capacitance. However, occurrence of galvanic corrosion at the welded portion between the positive electrode terminal and the terminal plate caused a 20% increase in electrical resistance between the negative electrode terminal and the terminal plate.

Comparative Example 2

A lithium ion capacitor was manufactured in the same manner as in Example 1, except that the positive electrode terminal was disposed so that the inner edge of the nickel-plating coating was located outside the outer container.

An examination of the properties of the resulting lithium ion capacitor showed a capacitance of 1,100 F, an energy density of 25 Wh/L, and an internal resistance of 2.3 mΩ.

This lithium ion capacitor was also subjected to the high-temperature, high-humidity float test in the same manner as in Example 1. The results showed no change in capacitance. However, occurrence of galvanic corrosion at the inner edge of the nickel-plating coating on the positive electrode terminal caused a 10% increase in electrical resistance between the negative electrode terminal and the terminal plate.

Comparative Example 3

A lithium ion capacitor was manufactured in the same manner as in Example 1, except that the positive electrode terminal was made up of a plate-shaped aluminum terminal substrate having a length of 70 mm, a width of 50 mm, and a thickness of 0.2 mm and on the entire surface of which a nickel-plating coating with a thickness of 2 μm was formed.

An examination of the properties of the resulting lithium ion capacitor showed a capacitance of 1,100 F, an energy density of 25 Wh/L, and an internal resistance of 2.3 mΩ.

This lithium ion capacitor was also subjected to the high-temperature, high-humidity float test in the same manner as in Example 1, but due to an excessive leakage current, the test was stopped. Then, the lithium ion capacitor was disassembled and examined. The results showed that the nickel-plating coating at the inner end portion of the positive electrode terminal was dissolved, and nickel was deposited on the negative electrode sheet to cause a short circuit between the positive electrode sheet and the negative electrode sheet.

REFERENCE SIGNS LIST

10 Electrode unit
11 Positive electrode sheet
11a Positive electrode current collector
11b Electrode layer
12 Negative electrode sheet
12a Negative electrode current collector
12b Electrode layer
13 Separator
15 Lithium ion supply source
16 Lithium electrode current collector
20 Outer container
21, 22 Outer film
23 Bonding portion
23a Central area
30 Positive electrode terminal
31 Terminal substrate
32 Nickel-plating coating
32e Inner edge
35 Negative electrode terminal

The invention claimed is:
1. An accumulator device comprising:
an outer container with mutually overlapped outer films bonded air-tightly to each other at a bonding portion formed along respective outer peripheral edge portions;
an electrode unit accommodated inside the outer container and having a positive electrode sheet and a negative electrode sheet stacked one on another with a separator disposed therebetween, the positive electrode sheet and the negative electrode sheet each having a current collector on which an electrode layer is formed;
a positive electrode terminal and a negative electrode terminal which are provided so as to protrude from inside the outer container to outside the outer container through the bonding portion; and
an electrolytic solution injected in the outer container, wherein
the positive electrode terminal has an aluminum terminal substrate and a nickel-plating coating formed on a surface of an outer end portion of the terminal substrate located outside the outer container, wherein an inner edge of the nickel-plating coating is located within the bonding portion, the thickness of the nickel-plating coating is 1 to 3 μm, and a protective film is provided between the positive electrode terminal and one of the outer films at the bonding portion.

2. The accumulator device according to claim 1, wherein the inner edge of the nickel-plating coating is located within a central area of the bonding portion in a width direction thereof, so that a ratio L/W is greater than 0 and less than 1, where W is a width of the bonding portion and L is a width of the central area.

3. The accumulator device according to claim 1, wherein a distance between an outer peripheral edge of the bonding portion and the inner edge of the nickel-plating coating is 0.5 mm or greater.

4. The accumulator device according to claim 1, wherein a distance between an inner peripheral edge of the bonding portion and the inner edge of the nickel-plating coating is 1.0 mm or greater.

5. The accumulator device according to claim 1, wherein the bonding portion has a width of 5 to 15 mm.

6. The accumulator device according to claim 1, wherein at least a surface of the negative electrode terminal is formed of nickel.

7. The accumulator device according to claim 1, wherein the accumulator device is a lithium ion capacitor, an electric double layer capacitor or a lithium ion secondary battery.

8. The accumulator device according to claim 1, wherein the protective film is a thermo-compressive film.

9. The accumulator device according to claim 1, wherein an inner vertical edge of the nickel-plating coating contacts the protective film.

* * * * *